US011539993B2

(12) United States Patent
Lewis et al.

(10) Patent No.: US 11,539,993 B2
(45) Date of Patent: *Dec. 27, 2022

(54) METHODS, SYSTEMS, AND MEDIA FOR PRESENTING NOTIFICATIONS INDICATING RECOMMENDED CONTENT

(71) Applicant: Google LLC, Mountain View, CA (US)

(72) Inventors: Justin Lewis, South San Francisco, CA (US); Richard Rapp, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,436

(22) Filed: Mar. 18, 2021

(65) Prior Publication Data

US 2021/0211755 A1 Jul. 8, 2021

Related U.S. Application Data

(63) Continuation of application No. 15/661,847, filed on Jul. 27, 2017, now Pat. No. 10,958,953.

(51) Int. Cl.
*H04N 7/173* (2011.01)
*H04N 21/25* (2011.01)
(Continued)

(52) U.S. Cl.
CPC ..... *H04N 21/251* (2013.01); *H04N 21/25875* (2013.01); *H04N 21/25891* (2013.01);
(Continued)

(58) Field of Classification Search
CPC ........... H04N 21/251; H04N 21/25875; H04N 21/25891; H04N 21/4108;
(Continued)

(56) References Cited

U.S. PATENT DOCUMENTS 9,165,259 B2  10/2015  Flinn et al.
9,420,319 B1   8/2016  Story et al.
(Continued)

FOREIGN PATENT DOCUMENTS

CN    101615961    12/2009
CN    101860696    10/2010
(Continued)

OTHER PUBLICATIONS

Examination Report dated Mar. 10, 2021 in EP Patent Application No. 18721606.4.
(Continued)

*Primary Examiner* — Annan Q Shang
(74) *Attorney, Agent, or Firm* — Kilpatrick Townsend & Stockton LLP

(57) ABSTRACT

Methods, systems, and media for presenting notifications indicating recommended content are provided. In some implementations, a method for presenting notifications of recommended content is provided, the method comprising: receiving an indication that a user device has initiated a casting session with at least one display device, wherein the indication includes an identifier of media content presented on the at least one display device during the casting session; storing the indication in a log in association with an identifier of the user device; receiving, from the user device, a request for recommended content to be presented on the at least one display device associated with the user device; in response to receiving the request, identifying a group of media content items based on at least one media content item that has been previously selected by a user account associated with the user device and based on an identifier of the at least one display device; generating a notification that includes an indication of the identified group of media content items and a selectable input that, when selected,
(Continued)

causes the identified group of media content items to begin being presented on the at least one display device; and transmitting the notification to the user device, wherein transmitting the notification to the user device causes the notification to be presented on the user device.

21 Claims, 6 Drawing Sheets

(51) Int. Cl.
H04N 21/41 (2011.01)
H04N 21/488 (2011.01)
H04N 21/482 (2011.01)
H04N 21/475 (2011.01)
H04N 21/258 (2011.01)
H04N 21/45 (2011.01)
H04N 21/466 (2011.01)

(52) U.S. Cl.
CPC ... *H04N 21/4108* (2013.01); *H04N 21/41265* (2020.08); *H04N 21/4532* (2013.01); *H04N 21/4667* (2013.01); *H04N 21/4668* (2013.01); *H04N 21/4753* (2013.01); *H04N 21/4826* (2013.01); *H04N 21/4882* (2013.01)

(58) Field of Classification Search
CPC ......... H04N 21/41265; H04N 21/4532; H04N 21/4667; H04N 21/4668; H04N 21/4753; H04N 21/4826; H04N 21/4882
See application file for complete search history.

(56) References Cited

U.S. PATENT DOCUMENTS

| | | | |
|---|---|---|---|
| 9,516,378 B1* | 12/2016 | Chen | H04N 21/44008 |
| 9,552,395 B2 | 1/2017 | Bayer et al. | |
| 9,986,004 B1* | 5/2018 | Carruth | H04L 65/612 |
| 10,405,044 B1 | 9/2019 | Seely et al. | |
| 2007/0058431 A1 | 3/2007 | Chung et al. | |
| 2008/0092199 A1 | 4/2008 | McCarthy et al. | |
| 2008/0301737 A1 | 12/2008 | Hjelmeland Almas et al. | |
| 2010/0014825 A1 | 1/2010 | Curtis et al. | |
| 2010/0042932 A1 | 2/2010 | Lehtiniemi et al. | |
| 2011/0074794 A1 | 3/2011 | Felt et al. | |
| 2011/0113122 A1 | 5/2011 | Drape | |
| 2011/0119706 A1 | 5/2011 | Scott et al. | |
| 2012/0072610 A1 | 3/2012 | Svendsen | |
| 2012/0072944 A1 | 3/2012 | Felt et al. | |
| 2013/0212614 A1 | 8/2013 | Reynolds et al. | |
| 2014/0366055 A1 | 12/2014 | Murakami | |
| 2015/0067727 A1* | 3/2015 | Velazquez | H04N 21/64322 725/33 |
| 2015/0193448 A1 | 7/2015 | Jeong et al. | |
| 2015/0281221 A1* | 10/2015 | Drope | G06F 21/6218 713/156 |
| 2015/0304733 A1 | 10/2015 | Mozell et al. | |
| 2015/0324605 A1 | 11/2015 | Yoon et al. | |
| 2016/0150278 A1 | 5/2016 | Greene | |
| 2016/0253710 A1* | 9/2016 | Publicover | H04N 21/4532 705/14.66 |
| 2017/0180438 A1 | 6/2017 | Persson | |
| 2017/0180899 A1 | 6/2017 | Proctor et al. | |
| 2017/0195731 A1 | 7/2017 | Girlando et al. | |
| 2017/0228550 A1 | 8/2017 | Harb | |
| 2018/0113577 A1 | 4/2018 | Burns et al. | |
| 2018/0249222 A1* | 8/2018 | Bandela | H04N 21/25808 |
| 2018/0260567 A1 | 9/2018 | Ullom | |
| 2019/0246170 A1 | 8/2019 | Sreekanth et al. | |
| 2020/0349611 A1 | 11/2020 | Publicover et al. | |

FOREIGN PATENT DOCUMENTS

| | | |
|---|---|---|
| CN | 102812667 | 12/2012 |
| JP | 2014154170 | 8/2014 |

OTHER PUBLICATIONS

International Search Report and Written Opinion dated Jun. 11, 2018 in International Patent Application No. PCT/US2018/027273.
Notice of Allowance dated Nov. 16, 2020 in U.S. Appl. No. 15/661,847.
Office Action dated Jan. 27, 2021 in CN Patent Application No. 201880037149.3.
Office Action dated Mar. 7, 2019 in U.S. Appl. No. 15/661,847.
Office Action dated Mar. 23, 2020 in U.S. Appl. No. 15/661,847.
Office Action dated Jul. 21, 2020 in U.S. Appl. No. 15/661,847.
Office Action dated Aug. 16, 2019 in U.S. Appl. No. 15/661,847.

* cited by examiner

METHODS, SYSTEMS, AND MEDIA FOR PRESENTING NOTIFICATIONS INDICATING RECOMMENDED CONTENT

CROSS-REFERENCE TO RELATED APPLICATION

This application is a continuation of U.S. patent application Ser. No. 15/661,847, filed Jul. 27, 2017, which is hereby incorporated by reference herein in its entirety.

TECHNICAL FIELD

The disclosed subject matter relates to methods, systems, and media for presenting notifications indicating recommended content.

BACKGROUND

Users frequently want to cast media content from a user device, such as a laptop computer, a tablet computer, or a mobile phone, to a presentation device, such as a television or speakers. For example, a user may want to select a media content item on a mobile phone and have the presentation of the media content item occur on a television. However, it can often be difficult for the user to identify content that the user may prefer to view on a particular presentation device at a convenient time.

Accordingly, it is desirable to provide methods, systems, and media for presenting notifications indicating recommended content.

SUMMARY

In accordance with various implementations of the disclosed subject matter, methods, systems, and media for presenting notifications indicating recommended content are provided.

In accordance with some implementations of the disclosed subject matter, a method for presenting notifications of recommended content is provided, the method comprising: receiving an indication that a user device has initiated a casting session with at least one display device, wherein the indication includes an identifier of media content presented on the at least one display device during the casting session; storing the indication in a log in association with an identifier of the user device; receiving, from the user device, a request for recommended content to be presented on the at least one display device associated with the user device; in response to receiving the request, identifying a group of media content items based on at least one media content item that has been previously selected by a user account associated with the user device and based on an identifier of the at least one display device; generating a notification that includes an indication of the identified group of media content items and a selectable input that, when selected, causes the identified group of media content items to begin being presented on the at least one display device; and transmitting the notification to the user device, wherein transmitting the notification to the user device causes the notification to be presented on the user device.

In some implementations, the group of media content items is identified based on a type of media content previously presented on the at least one display device.

In some implementations, the group of media content items is identified based on media content previously viewed in connection with the user account authenticated on the user device.

In some implementations, the method further comprises determining a previous time at which a second notification was transmitted to the user device, wherein the notification is transmitted to the user device in response to determining that more than a predetermined duration of time has elapsed since the previous time at which the second notification was transmitted to the user device.

In some implementations, the method further comprises: generating a configuration table that indicates one or more display devices that have been associated with the user device based on the stored log; and transmitting, to the user device, the configuration table, wherein the request received from the user device for recommended content is received after transmitting the configuration table to the user device.

In some implementations, the received request includes an identifier of the user account authenticated on the user device.

In accordance with some implementations of the disclosed subject matter, a system for presenting notifications of recommended content is provided, the system comprising: a hardware processor that is programmed to: receive an indication that a user device has initiated a casting session with at least one display device, wherein the indication includes an identifier of media content presented on the at least one display device during the casting session; store the indication in a log in association with an identifier of the user device; receive, from the user device, a request for recommended content to be presented on the at least one display device associated with the user device; in response to receiving the request, identify a group of media content items based on at least one media content item that has been previously selected by a user account associated with the user device and based on an identifier of the at least one display device; generate a notification that includes an indication of the identified group of media content items and a selectable input that, when selected, causes the identified group of media content items to begin being presented on the at least one display device; and transmit the notification to the user device, wherein transmitting the notification to the user device causes the notification to be presented on the user device.

In accordance with some implementations of the disclosed subject matter, a non-transitory computer-readable medium containing computer executable instructions that, when executed by a processor, cause the processor to perform a method for presenting notifications of recommended content is provided, the method comprising: receiving an indication that a user device has initiated a casting session with at least one display device, wherein the indication includes an identifier of media content presented on the at least one display device during the casting session; storing the indication in a log in association with an identifier of the user device; receiving, from the user device, a request for recommended content to be presented on the at least one display device associated with the user device; in response to receiving the request, identifying a group of media content items based on at least one media content item that has been previously selected by a user account associated with the user device and based on an identifier of the at least one display device; generating a notification that includes an indication of the identified group of media content items and a selectable input that, when selected, causes the identified group of media content items to begin being presented on the at least one display device; and transmitting the notification to the user device, wherein transmitting the notification to the user device causes the notification to be presented on the user device.

In accordance with some implementations of the disclosed subject matter, a system for presenting notifications of recommended content is provided, the system comprising: means for receiving an indication that a user device has initiated a casting session with at least one display device, wherein the indication includes an identifier of media content presented on the at least one display device during the casting session; means for storing the indication in a log in association with an identifier of the user device; means for receiving, from the user device, a request for recommended content to be presented on the at least one display device associated with the user device; means for identifying a group of media content items based on at least one media content item that has been previously selected by a user account associated with the user device and based on an identifier of the at least one display device in response to receiving the request; means for generating a notification that includes an indication of the identified group of media content items and a selectable input that, when selected, causes the identified group of media content items to begin being presented on the at least one display device; and means for transmitting the notification to the user device, wherein transmitting the notification to the user device causes the notification to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
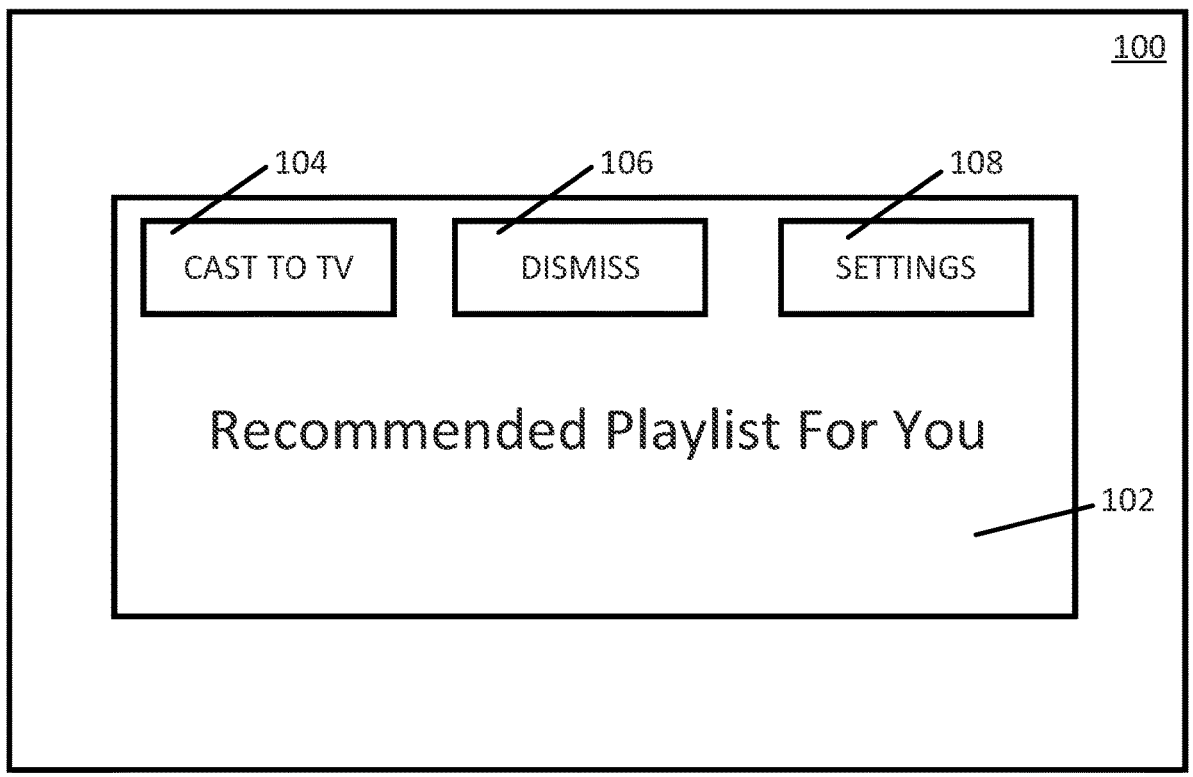
FIG. 1 shows an example of a user interface for presenting notifications of recommended content in accordance with some embodiments of the disclosed subject matter.

In accordance with various embodiments, mechanisms (which can include methods, systems, and media) for presenting notifications indicating recommended content are provided.

In some embodiments, the mechanisms described herein can cause a user device to detect the presence of a nearby display device that has previously been used to present casted media content from the user device. For example, in some embodiments, the user device (e.g., a mobile phone, a tablet computer, a wearable computer, and/or any other suitable type of user device) can have previously caused a media content item or a series of media content items to be presented on an associated television, a media receiver device, a projector, a speaker, an audio receiver device, a laptop computer, and/or any other suitable display device. In some embodiments, the mechanisms can cause the user device to request media content recommended for presentation on the detected display device from a server. The mechanisms can then cause the server to identify media content recommended for presentation on the display device and generate a notification that indicates the recommended media content. The server can then cause the notification to be presented on the user device, for example, as a push notification and/or any other suitable type of notification. In some embodiments, a user of the user device can then cause the recommended content to begin being presented on the display device through interaction with the notification on the display device. For example, in some embodiments, selection of a cast content input included in the notification can cause the user device to transmit instructions to the display device to begin presenting the recommended media content.

In some embodiments, the recommended media content can include any suitable type(s) of media content. For example, in some embodiments, the recommended media content can include videos, television programs, movies, music, live-streamed content, and/or any other suitable media content. In some embodiments, the recommended media content can include any suitable number (e.g., one, two, five, ten, twenty, and/or any other suitable number) of media content items. For example, in some embodiments, the recommended media content can include a playlist of media content items that include any suitable number of media content items arranged in a particular order.

In some embodiments, the recommended media content can be identified based on any suitable information. For example, in some embodiments, the server can identify a group of media content items that are similar to one or more media content items that have previously been cast by the user device to an associated display device. As another example, in some embodiments, the server can identify a group of media content items based on a type of device associated with a particular display device. As a more particular example, in instances where the display device is a television, the server can identify media content items that include video content. Alternatively, in instances where the display device is a speaker, the server can identify audio content items, such as songs or other music.

In some embodiments, the mechanisms can use any suitable technique or combination of techniques to determine whether a notification is to be presented. For example, in some embodiments, server can determine whether more than a predetermined duration of time (e.g., more than an hour, more than six hours, more than a day, and/or any other suitable duration of time) has elapsed since a previous notification was transmitted to the user device, and can transmit the notification if more than the predetermined duration of time has elapsed. As another example, in some embodiments, the user device can inhibit presentation of a received notification in response to determining that the user device is no longer in proximity to the detected display device.

Note that, in some embodiments, the media content item can include any suitable type of media content. For example, in some embodiments, the media content item can include video content, such as a video, a movie, a television program, live-streamed video content, a video chat, and/or any other suitable type of video content. As another example, in some embodiments, the media content item can include audio content, such as music, an audio file, a radio program, live-streamed audio content, and/or any other suitable type of audio content. Additionally or alternatively, in some embodiments, the media content item can be a media content item from a playlist or collection of media content items, such as a video in a playlist of videos, a song from a playlist of songs, and/or any other suitable type of playlist or collection of media content items.

It should be noted that, although the embodiments described herein generally refer to a user device that casts media content to a display device or a presentation device, this is merely illustrative and the user device can cast media content to any suitable castable device having a remote control media streaming feature.

Turning to FIG. 1, an example 100 of a user interface for presenting a notification on a user device of recommended content is shown in accordance with some embodiments of the disclosed subject matter. As illustrated, in some embodiments, user interface 100 can include a notification 102, a cast content input 104, a dismiss notification input 106, and a setting input 108.

In some embodiments, notification 102 can indicate content that has been identified as suitable for recommendation to a viewer of user interface 100. For example, as described below in connection with FIGS. 4 and 5, in some embodiments, the content can be content that has been identified as relevant to the viewer's interests, similar to previously viewed content, and/or any other suitable content. In some embodiments, notification 102 can include any suitable content, such as text that indicates the content (e.g., a name of a recommended video, a name of a recommended song, a name of a recommended playlist, and/or any other suitable text), and suitable images or icons, and/or any other suitable content. Note that, in some embodiments, the recommended content can include any suitable type(s) of content, such as videos, movies, television programs, live-streamed content, audio content, and/or playlists of media content (e.g., a playlist of videos, a playlist of audio content, and/or any other suitable type of playlist). In some embodiments, notification 102 can be presented in any suitable manner, such as a push notification on a home screen of the user device, a push notification that appears on a currently displayed desktop or window of the user device, and/or any other suitable notification.

In some embodiments, cast content input 104 can be any suitable selectable input that, when selected, causes the user device to begin presenting the content indicated in notification 102 on an associated display device (e.g., an associated television, associated speakers, and/or any other suitable associated display device). For example, in some embodiments, selection of cast content input 104 can cause the user device to transmit an instruction to the associated display device to open an application for presenting the indicated content and to begin presenting the indicated content within the application. As another example, in some embodiments, selection of cast content input 104 can cause the user device to transmit an instruction to the associated display device that include a location (e.g., a Uniform Resource Locator, or URL) associated with the indicated content. More detailed techniques for casting the indicated content from the user device to an associated display device are described below in connection with FIGS. 4 and 6.

In some embodiments, dismiss notification input 106 can be any suitable selectable input that, when selected, causes notification 102 to be removed from user interface 100. In some embodiments, notification 102 can be removed in any other suitable manner, such as swiping notification 102 off of a screen on which user interface 100 is being displayed, and/or in any other suitable manner. In some such embodiments, dismiss notification input 106 can be omitted.

In some embodiments, settings input 108 can be any suitable selectable input that, when selected, causes a user interface for setting and/or modifying user-configured settings associated with display of notifications. For example, in some embodiments, the settings interface can allow a user to indicate sounds associated with presentation of a notification, that notifications should not be presented at particular times, that notifications of particular types (e.g., notifications that recommend content, and/or any other suitable type of notification) are not to be presented at particular times, and/or any other suitable settings.

Figure 2:
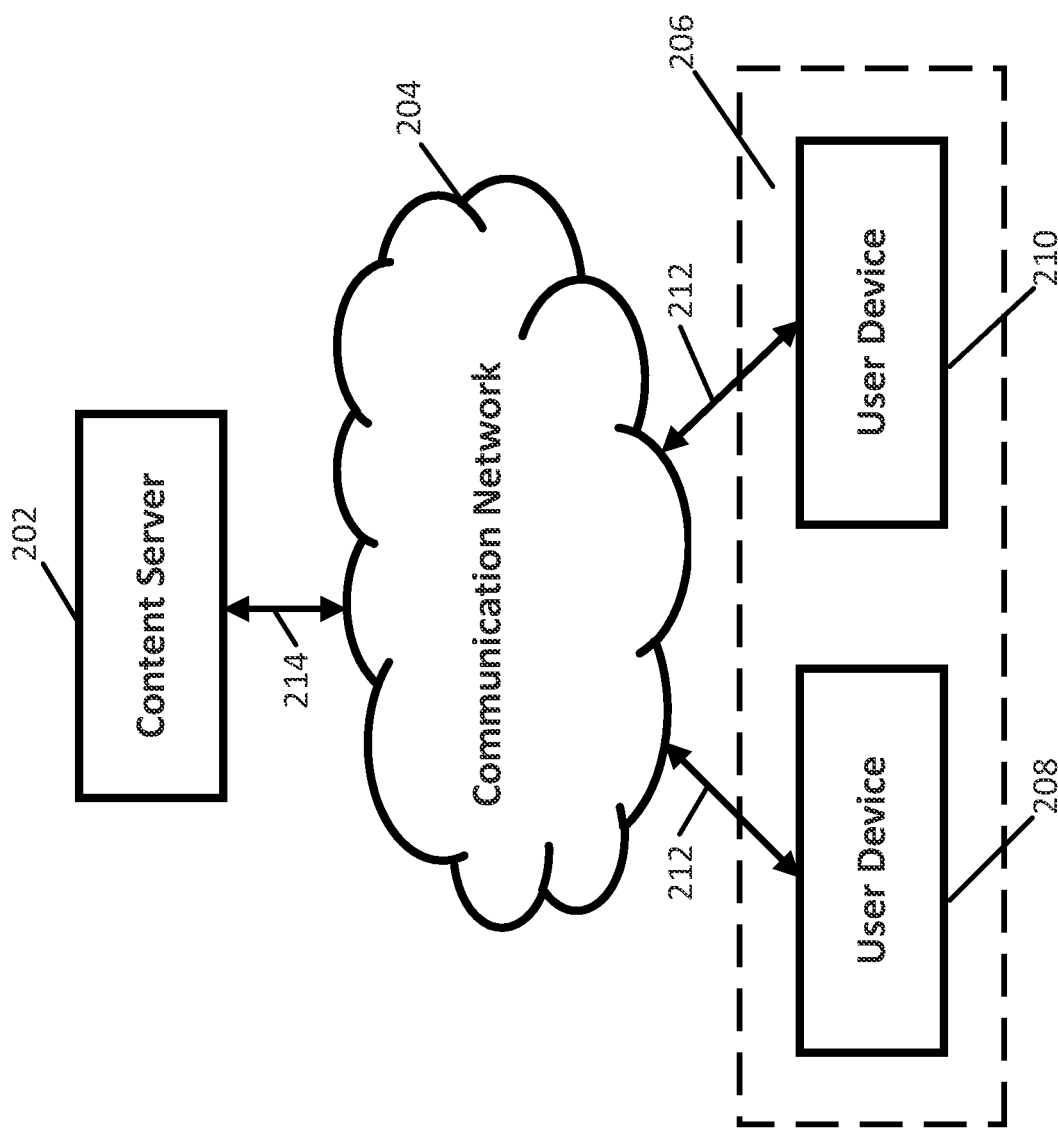
FIG. 2 shows a schematic diagram of an illustrative system suitable for implementation of mechanisms described herein for presenting notifications of recommended content in accordance with some embodiments of the disclosed subject matter.

Turning to FIG. 2, an illustrative example 200 of hardware for presenting notifications indicating recommended content that can be used in accordance with some embodiments of the disclosed subject matter is shown. As illustrated, hardware 200 can include one or more servers such as a content server 202, a communication network 204, and/or one or more user devices 206, such as user devices 208 and 210.

In some embodiments, content server 202 can be any suitable server for storing content and transmitting the content to a user device for presentation, generating content recommendations, transmitting notifications of the content recommendations to user devices, and/or performing any other suitable function(s). For example, in some embodiments, content server 202 can be a server that transmits media content to user device 206 via communication network 204. As another example, in some embodiments, content server 202 can be a server that receives a request for recommended content from a user device and generates a playlist of content that is determined to be of interest to a user of the user device. In some embodiments, the content on content server 202 can be any suitable content, such as video content, audio content, movies, television programs, live-streamed content, audiobooks, and/or any other suitable type of content. In some embodiments, content server 202 can be omitted.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to content server 202. Communications links 212 and/or 214 can be any communications links suitable for communicating data among user devices 206 and server 202 such as network links, dial-up links, wireless links, hard-wired links, any other suitable communications links, or any suitable combination of such links.

In some embodiments, user devices 206 can include one or more computing devices suitable for viewing media content items, transferring playback of a media content item to an associated device (e.g., a television, speakers, and/or any other suitable type of user device), receiving notifications that indicate recommended media content items, and/or any other suitable functions. For example, in some embodiments, user devices 206 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

In a more particular example, user device 206 can be a display device that includes hardware and/or software for presenting media received from one or more sources of media content. For example, user device 206 can include a television, a smart television, a monitor, a set-top box, an audio video (AV) receiver, any other suitable media playback device and/or any suitable combination thereof. More particularly, user device 206 can include a display, speakers, hardware and/or software for rendering media content such as analog and/or digital video and/or audio data, a power supply, etc. User device 206 can, in some implementations, include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In another more particular example, user device 206 can be any suitable device that can receive an audio signal and output the audio signal (potentially through one or more intermediate devices) to one or more speakers. For example, user device 206 can be an audio video (AV) receiver, a speaker, an amplifier, an audio switch, an HDMI switch, any other suitable audio system and/or any suitable combination thereof. More particularly, user device 206 can include, speakers, hardware and/or software for rendering media content such as analog and/or digital audio and/or video data, a power supply, etc. User device 206 can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some implementations, user device 206 can be configured to receive an audio signal over any suitable wireless connection, such as over a connection to a local area network (e.g., via a connection that complies with one of the IEEE 802.11x family of protocols which are sometimes referred to as Wi-Fi connections), or a wireless connection between external sound system 106 and computing device 102, such as an ad hoc wireless network connection, a short-range wireless communication protocol (e.g., Bluetooth, Bluetooth Low Energy, Wireless USB, etc.), etc.

Although content server 202 is illustrated as a single device, the functions performed by content server 202 can be performed using any suitable number of devices in some embodiments. For example, in some embodiments, multiple devices can be used to implement the functions performed by content server 202.

Although two user devices 208 and 210 are shown in FIG. 2, any suitable number of user devices, and/or any suitable types of user devices, can be used in some embodiments.

Figure 3:
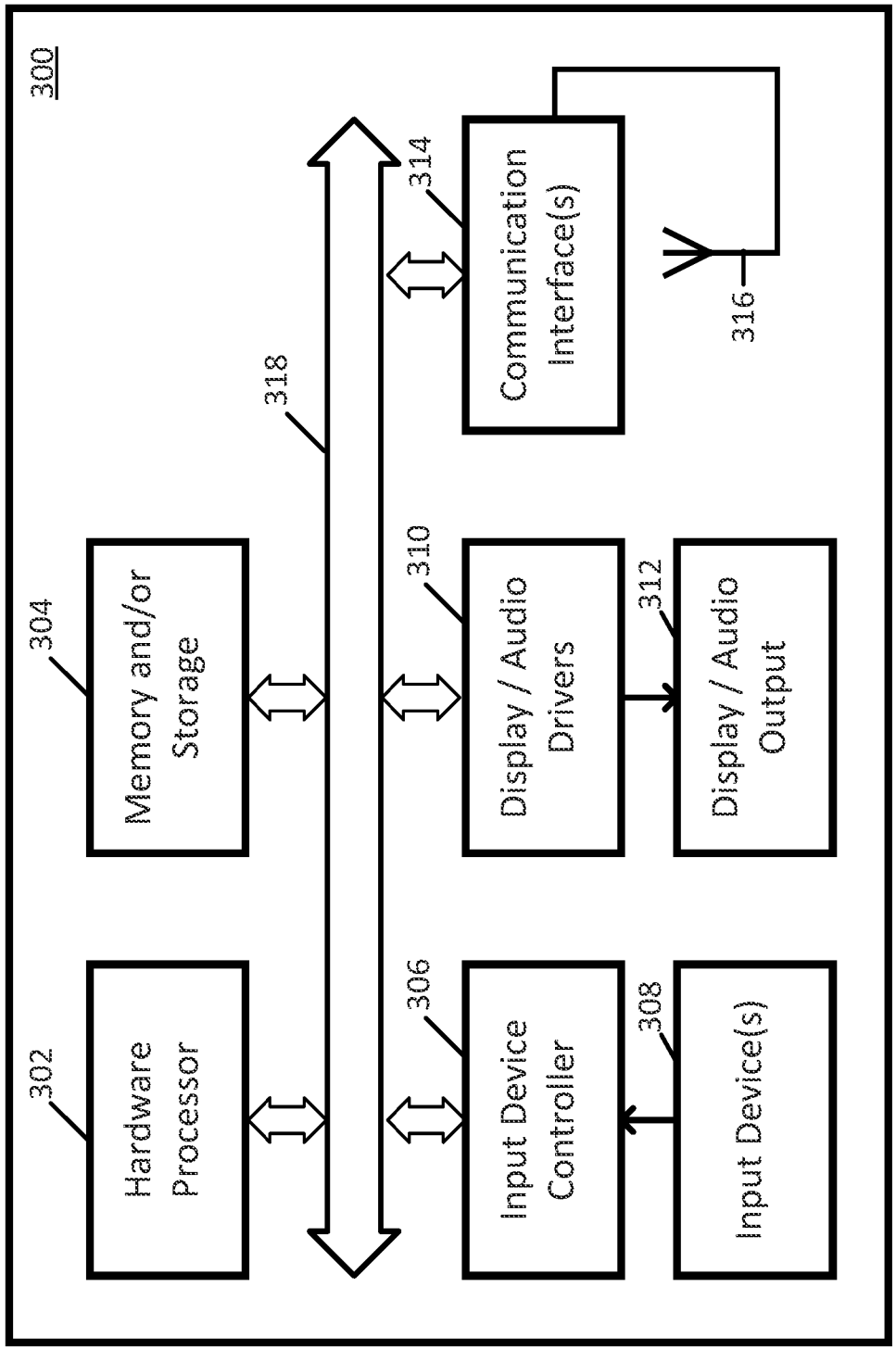
FIG. 3 shows a detailed example of hardware that can be used in a server and/or a user device of FIG. 2 in accordance with some embodiments of the disclosed subject matter.

Content server 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, the server program can cause hardware processor 302 of content server 202 to identify recommended media content for a particular user device, generate a notification that indicates the recommended media content, transmit the notification to the user device, and/or perform any other suitable functions. In some embodiments, hardware processor 302 can be controlled by a computer program stored in memory and/or storage 304 of user device 206. For example, the computer program can cause hardware processor 302 of user device 206 to receive a notification that indicates recommended content, present the notification, cause the recommended content to be presented by a display device associated with user device 206, and/or perform any other suitable functions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
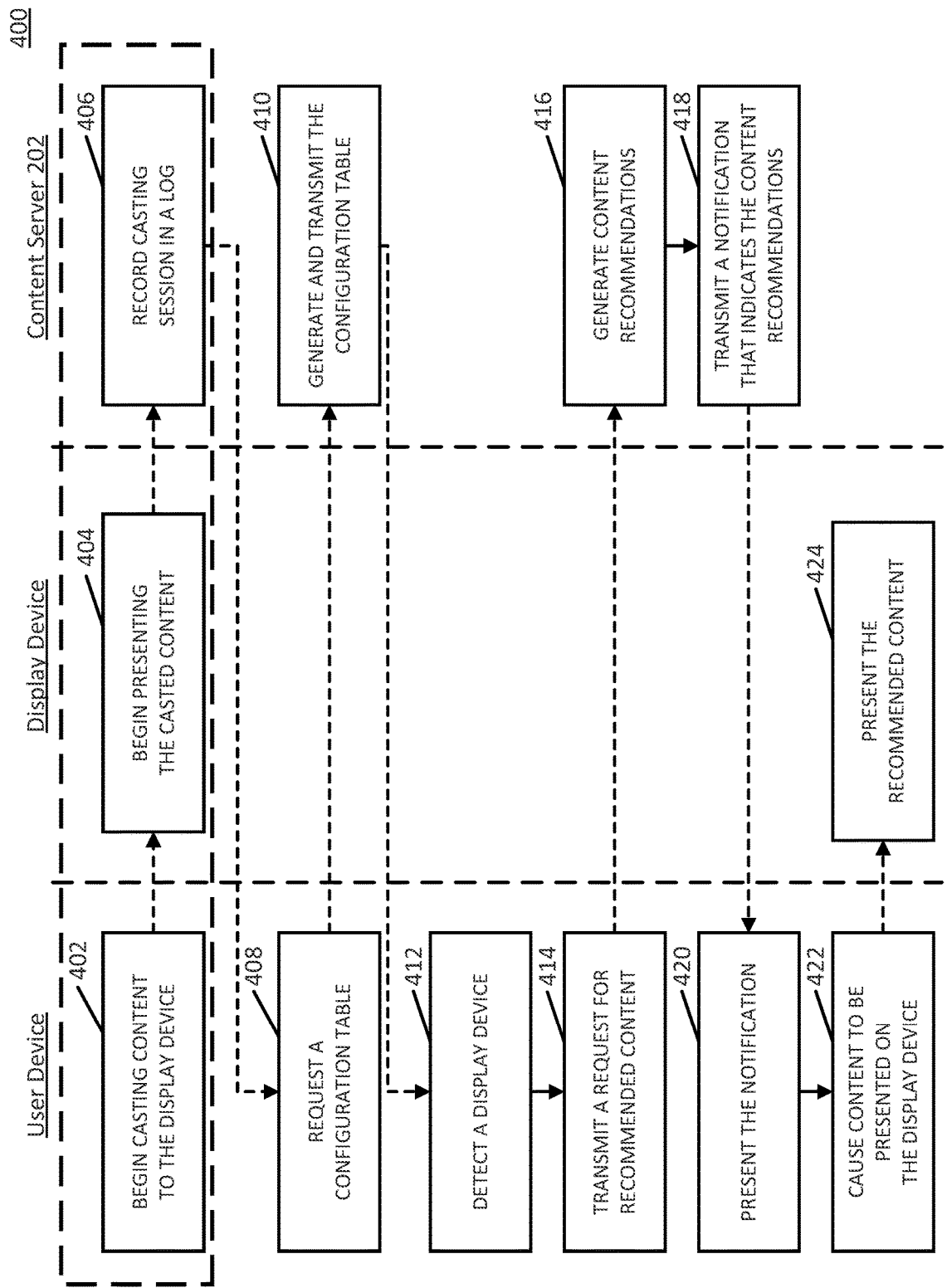
FIG. 4 shows an illustrative example of an information flow diagram for presenting notifications of recommended content in accordance with some embodiments of the disclosed subject matter.

Turning to FIG. 4, an illustrative example 400 of an information flow diagram for presenting notifications of recommended content is shown in accordance with some embodiments of the disclosed subject matter. In some embodiments, blocks of process 400 can be executed on a user device (e.g., a mobile phone, a tablet computer, a wearable computer, a laptop computer, a desktop computer, and/or any other suitable type of user device), a display device associated with the user device (e.g., a television, speakers, a projector, and/or any other suitable display device), and/or content server 202.

At 402, the user device can begin casting media content to a display device associated with the user device. For example, in some embodiments, the user device can cause the display device to present the casted media content. In some embodiments, the user device, can cast the media content to the display device using any suitable technique or combination of techniques. For example, in some embodiments, the user device can transmit an instruction to the display device that causes the display device to launch an application for presenting the media content. In some such embodiments, the instructions can additionally include an identifier of the media content to be presented, such as a URL and/or any other suitable location information. As another example, in some embodiments, the user device can transmit an instruction to the display device that includes a location of the media content (e.g., a URL, and/or any other suitable location information), and the instructions can cause the display device to retrieve the media content from the location and begin presenting the media content. As yet another example, in some embodiments, the user device can transmit a media stream that includes the media content to the display device. In some embodiments, the user device and the display device can communicate in any suitable manner, for example, via a communication network the user device and the display device are both connected to, such as a local WiFi network, a BLUETOOTH network, and/or any other suitable communication network.

Note that, in some embodiments, the user device can begin casting the media content to the display device in response to any suitable information or event. For example, in some embodiments, the user device can begin casting the media content in response to determining that a selectable input associated with initiation a casting session has been selected on the user device. In some such embodiments, the selectable input can indicate the display device (e.g., "cast to television," and/or any other suitable indication).

At 404, the display device can begin presenting the casted media content. For example, in instances where the casted media content includes video content, the display device can begin presenting the media content within a video player window on the display device. As another example, in instances where the casted media content includes audio content, the display device can begin presenting the audio content via speakers associated with the display device.

At 406, content server 202 can record the initiated casting session in a log. In some embodiments, an entry in the log can include any suitable information. For example, in some embodiments, the entry in the log associated with the initiated casting session can indicate an identifier associated with the user device, an identifier associated with the display device, an identifier of a user account authenticated on the user device and/or the display device, and/or any other suitable identifier information. As another example, in some embodiments, the entry in the log associated with the initiated casting session can include an identifier of the casted media content, such as a URL associated with the casted media content, a name associated with the casted media content, and/or any other suitable identifying information. In some embodiments, the log can be stored in any suitable manner. For example, in some embodiments, the log can be stored in a table that is keyed based on the identifier associated with the user device. In some such embodiments, a value associated with such a row can include any other suitable information associated with the casting session, such as the identifier of the user account, the identifier of the display device, the identifier of the casted media content, and/or any other suitable information.

Note that, in some embodiments, blocks 402-406 can be performed at any suitable time, and block 408 can occur at any suitable time after blocks 402-406 have been performed. For example, in some embodiments, blocks 402-406 can be performed at a first time when the user device initiates a casting session with an associated display device, and block 408 can be performed at a second time (e.g., an hour later, a day later, a week later, and/or at any other suitable time) by the user device.

At 408, the user device can request a configuration table from content server 202. In some embodiments, the configuration table can include any suitable information. For example, in some embodiments, the configuration table can indicate identifiers of display devices associated with the user device that, when detected in proximity to the user device, are to trigger presentation of a notification of recommended content that can be presented by the display device. As another example, in some embodiments, the configuration table can indicate identifiers of one or more user accounts that are to be authenticated on the user device prior to presentation of a notification of recommended content.

In some embodiments, the user device can request the configuration table based on any suitable information. For example, in some embodiments, the user device can request the configuration table at a periodic time interval (e.g., once per day, once per week, and/or at any other suitable time interval). As another example, in some embodiments, the user device can request the configuration table in response to determining that an application associated with presentation of media content on the user device is being updated and/or has been recently updated.

At 410, in response to receiving the request from the user device, content server 202 can generate and transmit the configuration table. In some embodiments, content server 202 can generate the configuration table using any suitable technique or combination of techniques. For example, in some embodiments, content server 202 can generate the configuration table based on the log of initiated casting sessions described above in connection with block 406. As a more particular example, in some embodiments, content server 202 can identify, based on the log, one or more display devices that have been previously used to cast content from the user device, and can generate a configuration table that includes identifiers of the one or more display devices.

At 412, the user device can detect a nearby display device. In some embodiments, the display device can be any suitable display device, such as a nearby television, projector, speakers, desktop computer, and/or any other suitable display device. In some embodiments, the display device can be a display device that is already associated with the user device, for example, one that a user of the user device has already configured to be associated with the user device by authenticating a user account on both the user device and the display device. Alternatively, in some embodiments, the display device can be a display device that is detected by the user device but has not been previously associated with the user device. In some embodiments, the display device can be detected by the user device using any suitable technique(s) and/or protocols. More detailed techniques for detecting a display device by the user device are described below in connection with block 604 of FIG. 6. Note that, in some embodiments, the display device can detect a nearby user device, for example, by identifying user devices connected to the same communication network (e.g., a WiFi network, a BLUETOOTH network, and/or any other suitable communication network) as the display device.

In some embodiments, the user device can determine whether the detected display device is included in a list of display devices in the configuration table received at block 410. In some embodiments, in response to determining that the detected display devices is included in the list of display devices, the user device can transmit, at 414, a request for recommended content to content server 202. Note that, in some embodiments, the user device can maintain a list of display devices (e.g., in memory 304 of the user device) that have been associated with the user device in the past, and can determine whether detected display device is included in this list. In some such embodiments, the user device can use a locally maintained list of display devices rather than requesting a configuration table from content server 202.

At 416, content server 202 can generate content recommendations. In some embodiments, the content recommendations can include any suitable content of any suitable type. For example, in some embodiments, the content can include video content (e.g., videos, movies, television programs, live-streamed video content, and/or any other suitable video content), audio content (e.g., music, radio programs, live-streamed audio content, audiobooks, and/or any other suitable audio content), and/or any other suitable type of media content. As another example, in some embodiments, content server 202 can generate a playlist of media content items, such as a playlist of videos, a playlist of songs, and/or any other suitable type of playlist, as described below in more detail in connection with FIG. 5.

At 418, content server 202 can generate and transmit a notification that indicates the content recommendation to the user device. In some embodiments, the notification can include any suitable content, such as a name assigned to a generated playlist of media content, an indication of a genre associated with the recommended content, and/or any other suitable information. Additionally or alternatively, as shown in and described above in connection with FIG. 1, the notification can include any suitable selectable inputs, such as a selectable input that causes the recommended content to begin being present on the display device, a selectable input that causes the notification to be dismissed, a selectable input that causes a settings interface to be presented, and/or any other suitable selectable inputs. In some embodiments, content server 202 can transmit any suitable instructions that cause the notification to be rendered on the user device, for example, as a push notification presented on a home screen or window of the user device, and/or in any other suitable manner.

At 420, the user device can present the notification. In some embodiments, the user device can present the notification in any suitable manner. For example, an example user interface for presenting the notification is shown in and described above in connection with FIG. 1.

At 422, in response to determining that a selectable input to cast the recommended content to the display device has been selected on the user device via the notification (e.g., cast content input 104 of FIG. 1), the user device can cause the recommended content to begin being presented on the display device. For example, in some embodiments, the user device can transmit an indication of the recommended content (e.g., a URL associated with a recommended content item, a URL associated with a generated playlist, and/or any other suitable indication) to the display device. More detailed techniques for causing the recommended content to be presented on the display device are described below in connection with block 612 of FIG. 6.

At 424, the display device can begin presenting the recommended content. In some embodiments, the display device can present the recommended content in any suitable manner. For example, in some embodiments, in response to receiving, from the user device, an instruction to begin presenting the recommended content, the display device can launch an application associated with presentation of media content (e.g., an application associated with a particular video sharing service, and/or any other suitable application), and can begin presenting the recommended content through the application. As another example, in instances where the recommended content includes video content, the display device can present the video content within a video player window. As yet another example, in instances where the recommended content includes a playlist of media content, the display device can present a first media content item in the playlist and can then begin presenting a second media content item in the playlist in response to determining that the first media content item has finished presentation.

Figure 5:
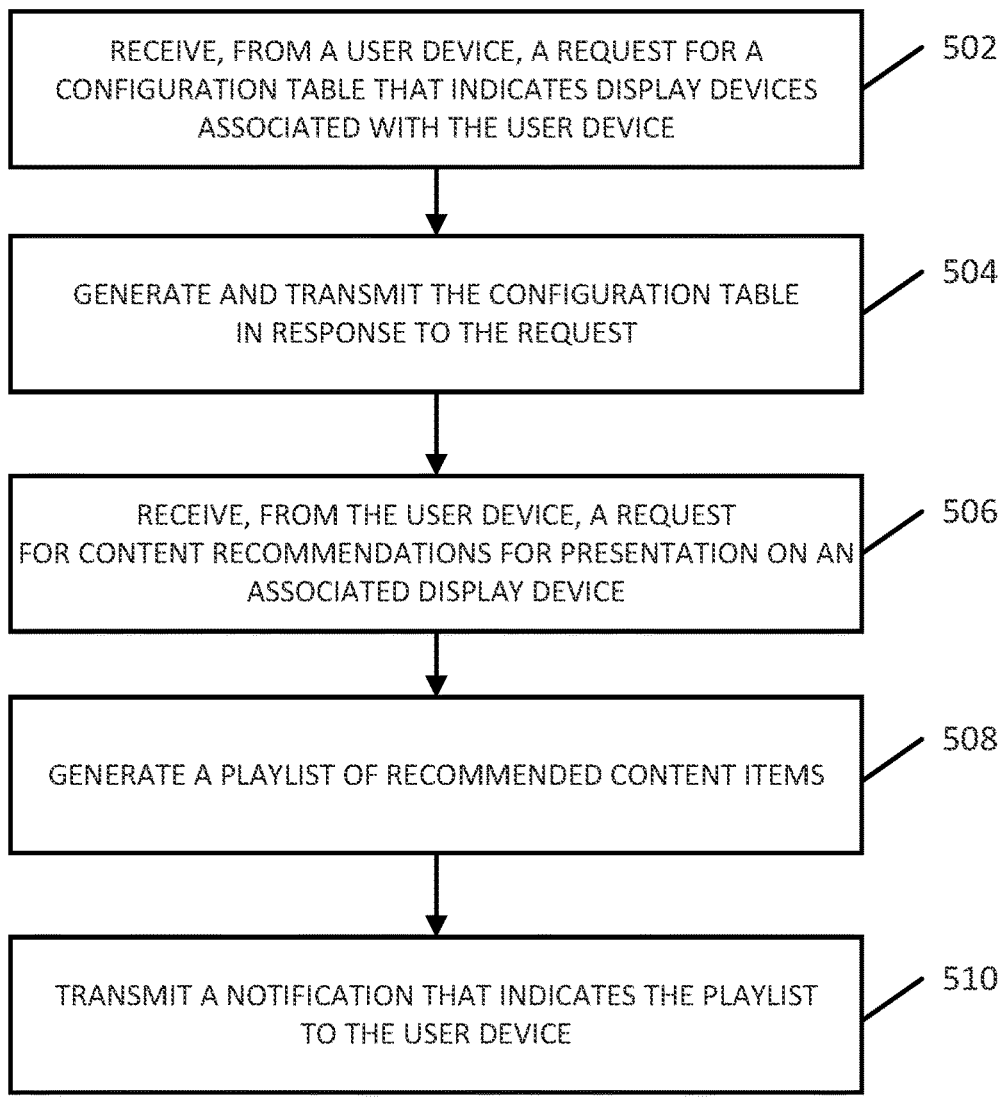
FIG. 5 shows an example of a process for generating content recommendations for a user device in accordance with some embodiments of the disclosed subject matter.

Turning to FIG. 5, an illustrative example 500 of a process for generating content recommendations and a notification that indicates the content recommendations is shown in accordance with some embodiments of the disclosed subject matter. In some embodiments, blocks of process 500 can be executed on content server 202.

At 502, process 500 can begin by receiving, from a user device, a request for a configuration table that indicates display devices associated with the user device. As described above in connection with block 408 of FIG. 4, in some embodiments, the configuration table can be requested based on any suitable information, such as that a predetermined interval has elapsed since a previous time the configuration table was transmitted to the user device, and/or any other suitable information.

In some embodiments, process 500 can generate and transmit the configuration table to the user device in response to receiving the request at 504. As described above in connection with block 410 of FIG. 4, in some embodiments, process 500 can generate the configuration table based on any suitable information. For example, in some embodiments, process 500 can determine identifiers associated with one or more display devices that have been previously used to present casted content from the user device and can generate a table that includes the identifiers of the one or more display devices. In some such embodiments, process 500 can generate the configuration table based on, for example, a log of casting sessions, as described above in connection with block 406 of FIG. 4. Note that, in some embodiments, blocks 502 and 504 of process 500 can be repeated any suitable number of times, for example, in response to a user device requesting periodic updates to a configuration table.

At 506, process 500 can receive, from the user device, a request for content recommendations for presentation on an associated display device. In some embodiments, the associated display device can be a display device that is included in the configuration table transmitted to the user device at block 504. Note that, in some embodiments, any suitable duration of time (e.g., a day, a week, a month, and/or any other suitable duration of time) can have elapsed between block 504 and 506. As described below in connection with block 604 of FIG. 6, in some embodiments, the request can be received in response to the user device detecting an associated display device in proximity to the user device.

In some embodiments, the received request can include any suitable information. For example, in some embodiments, the received request can include an identifier of a user account currently authenticated on the user device. In some such embodiments, authentication of the user account can correspond to an association between the user device and the display device. As a more particular example, in some embodiments, the user account may be used to establish a pairing between the user device and the display device by authenticating the user account on both the user device and the display device. As another example, in some embodiments, the received request can include an identifier of a particular display device associated with the user device and/or a device type associated with a particular display device. As a more particular example, in some embodiments, the identifier or device type can indicate that the display device is a particular display device (e.g., "Bedroom television," "car speakers," and/or any other suitable particular device) or a display device of a particular type (e.g., television, BLUETOOTH speakers, and/or any other suitable device type).

At 508, process 500 can identify recommended content for presentation on the associated display device. Process 500 can identify the recommended content based on any suitable information. For example, in some embodiments, process 500 can identify one or more media content items that have been previously cast from the user device to the associated display device in association with the authenticated user account and can determine the recommended content based on the previously presented media content items. In some embodiments, process 500 can identify the previously presented media content items based on any suitable information, such as the log of casting sessions described above in connection with block 406 of FIG. 4.

In some embodiments, process 500 can identify one or more media content items related to previously presented media content items using any suitable technique or combination of techniques. For example, in some embodiments, process 500 can identify one or more media content items relating to the same or a similar topic (e.g., sports, news, and/or any other suitable topic) as previously presented media content items. As another example, in some embodiments, process 500 can identify one or more media content items created by the same content creator (e.g., produced by the same channel, featuring the same band or artist, and/or any other suitable content creator) as previously presented media content items. As yet another example, in instances where the previously presented media content items include audio content (e.g., songs, and/or any other suitable audio content), process 500 can identify one or more other audio content items that are similar to the previously presented audio content based on any criteria (e.g., a similar type of music, and/or similar in any other manner).

In instances where process 500 identifies more than one previously presented media content item associated with the authenticated user account, process 500 can select a subset of the previously presented media content items from which to identify related content based on any suitable criteria. For example, in some embodiments, process 500 can select the subset of previously presented media content items based on a particular display device associated with the request and/or based on a type of display device associated with the request. As a more particular example, in instances where the request corresponds to content to be presented on speakers, process 500 can select the subset of previously presented media content items to include music or other audio content. As another example, in some embodiments, process 500 can select the subset of previously presented media content items based on types of content that have been previously presented on a particular type of display device. As a more particular example, in instances where a user has frequently cast music videos to a living room television but rarely casts documentary videos to the living room television, and where the request is for content to be presented on the living room television, process 500 can select the subset of previously presented media content items to include music videos and/or to not include documentary videos. As yet another example, in some embodiments, process 500 can select the subset of previously presented media content items based on a time of day the media content items were presented. As a more particular example, in instances where the user has previously viewed media content items corresponding to news videos in the morning and music videos in the evening, process 500 can select the subset of previously presented media content items to include those corresponding to a type previously viewed by the user at the time of day of the request.

In some embodiments, process 500 can identify any suitable number of related media content items. In some embodiments, process 500 can generate a playlist that includes the identified media content items. For example, in some embodiments, the playlist can include a series of media content items to be played in an indicated order. Note that, in some embodiments, the playlist can additionally include any suitable number of breaks within the playlist, for example, to present advertisements and/or any other suitable content.

At 510, process 500 can generate a notification that indicates the generated content recommendations and can cause the notification to be presented on the user device. In some embodiments, the notification can include any suitable content, such as text that describes a generated playlist (e.g., "Top 40 playlist," and/or any other suitable text), any suitable icons or images, and/or any other suitable content. In some embodiments, process 500 can transmit, to the user device, instructions that cause the notification to be rendered in any suitable manner on the user device. For example, in some embodiments, the notification can be presented as a push notification, as a pop-up window on a screen of the user device, and/or in any other suitable manner. An illustrative example of a notification is shown in and described above in connection with FIG. 1.

Note that, in some embodiments, process 500 can store an indication or identifier of the content recommendation(s) in association with an identifier of the transmitted notification. For example, in some embodiments, process 500 can store a URL associated with a recommended media content item in association with an identifier of the user device and/or user account receiving the notification. As another example, in some embodiments, process 500 can store a list of media content items including in a generated playlist of media content items in associated with an identifier of the user device and/or user account receiving the notification.

Additionally, note that, in some embodiments, process 500 can determine whether to transmit the notification to the user device based on any suitable information. For example, in some embodiments, process 500 can determine whether more than a predetermined duration of time (e.g., more than an hour, more than six hours, more than a day, and/or any other suitable duration of time) has elapsed since a previous time process 500 has transmitted a notification to the user device.

Figure 6:
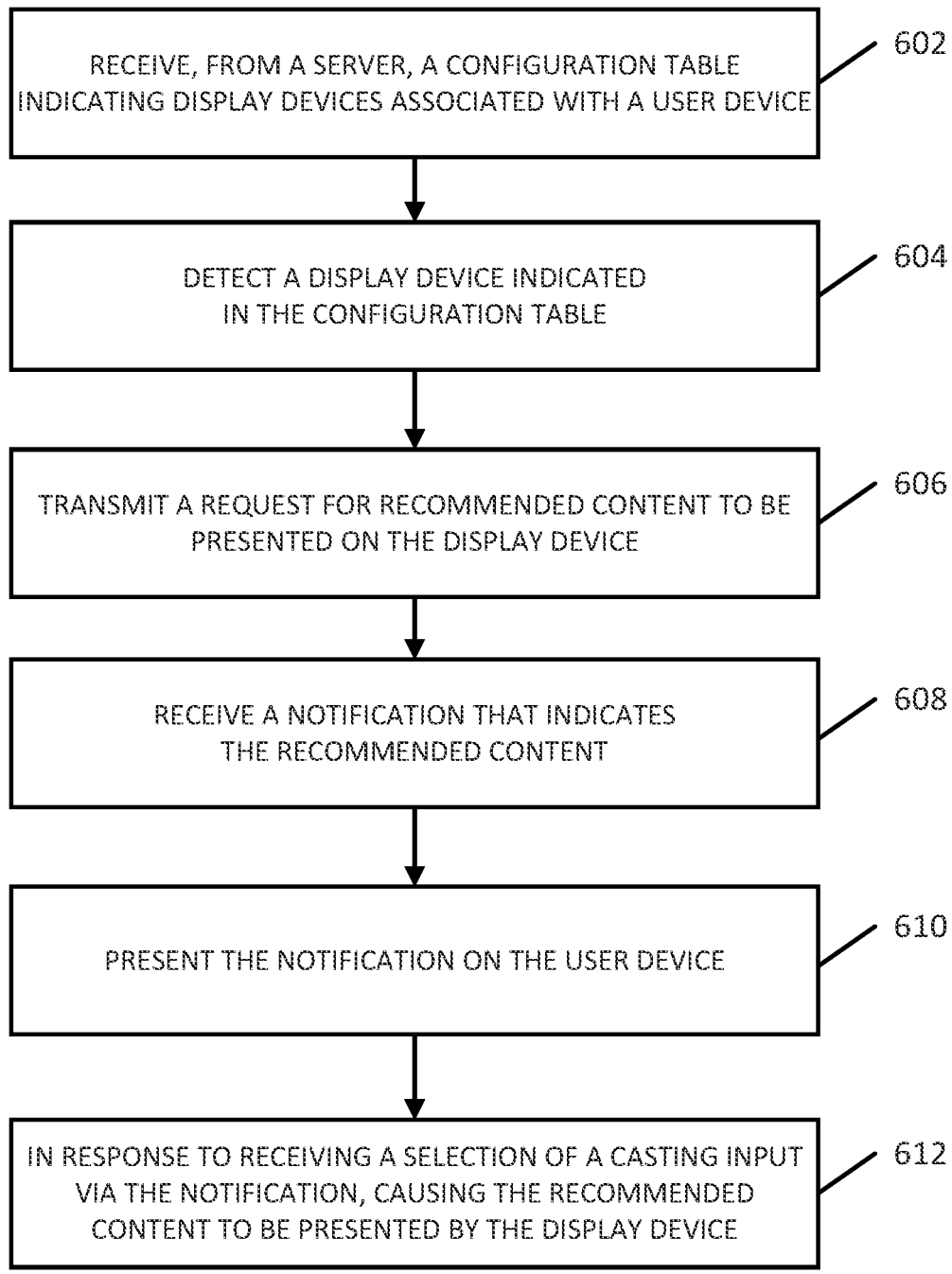
FIG. 6 shows an example of a process for presenting a notification of recommended content on a user device and transferring playback of the recommended content to an associated display device in accordance with some embodiments of the disclosed subject matter.

Turning to FIG. 6, an illustrative example 600 of a process for detecting a nearby display device and requesting content recommendations for presentation on the detected display device is shown in accordance with some embodiments of the disclosed subject matter. In some embodiments, blocks of process 600 can be performed on user device 206.

Process 600 can begin by receiving, from a server, a configuration table indicating display devices associated with the user device. In some embodiments, the configuration table can indicate display devices that have been previously used to present casted content by the user device. In some embodiments, the configuration table can be generated by the server based on a log of previous casting sessions initiated by the user device as identifier from a log of casting sessions stored on the server, as described above in more detail in connection with block 406 of FIG. 4 and block 504 of FIG. 5.

Process 600 can detect a nearby display device at 604. Note that, in some embodiments, any suitable duration of time (e.g., an hour, a day, two days, and/or any other suitable time) can have elapsed between block 602 and 604. In some embodiments, process 600 can detect the nearby display device using any suitable technique or combination of techniques. For example, in some embodiments, process 600 can initiate any suitable device discovery protocol to detect nearby display devices. As a more particular example, in some embodiments, the user device can identify display devices currently connected to a particular communication network (e.g., a local WiFi network the user device is connected to, a BLUETOOTH network, and/or any other suitable network). In some embodiments, a discovery protocol can include transmitting a multicast message to all devices on a particular network and requesting device details from the devices on the network. Additionally, in some embodiments, the multicast message can be addressed to certain types of devices and/or can be compatible with a discovery protocol for devices that comply with a particular standard (e.g., Universal Plug and Play (UPnP), Digital Living Network Alliance (DLNA), etc.). In some embodiments, process 600 can use any other suitable location or proximity information to determine a location of the user device and/or identify nearby display devices, such as using Global Positioning System (GPS) coordinates.

In some embodiments, process 600 can determine whether the detected display device is included in the configuration table received at block 602. For example, in some embodiments, process 600 can compare an identifier associated with the detected display device with identifiers of display devices included in the configuration table.

In some embodiments, display devices included in the configuration table can indicate display devices that, when detected by the user device, are to trigger a request for recommended content to be presented in a notification. In some such embodiments, process 600 can transmit a request to the server for recommended content to be presented on the detected display device at 606 in response to determining that the detected display device is included in the configuration table. Note that, in some embodiments, prior to transmitting the request, process 600 can determine whether to transmit the request to the server based on any suitable information. For example, in some embodiments, process 600 can determine a likelihood that connection to the detected display device is due to a disconnection and subsequent re-connection of the user device to a particular network (e.g., to a local WiFi or BLUETOOTH network). As a more particular example, in some embodiments, process 600 can determine whether the user device has previously been connected to the detected display device within a predetermined duration of time (e.g., within the last five minutes, within the last hour, and/or any other suitable duration), and if the user device has previously been connected to the display device within the predetermined duration of time, determine that a request is not to be transmitted.

In some embodiments, process 600 can transmit the request using any suitable technique(s). For example, in some embodiments, the request can be a Remote Procedure Call (RPC) to the server. In some embodiments, the RPC can include any suitable information, such as an identifier of a user account authenticated on the user device and/or the detected display device, an identifier of the detected display device, and/or any other suitable information.

At 608, process 600 can receive from the server, in response to the transmitted request, a notification that indicates recommended content for presentation on the detected display device. In some embodiments, the notification can include any suitable content, such as text that indicates the recommended content (e.g., "Top 40s playlist," "kitten videos," and/or any other suitable text). Additionally or alternatively, in some embodiments, the notification can include one or more selectable inputs, as shown in and described above in connection with FIG. 1. For example, in some embodiments, the notification can include a cast content input, a dismiss notification input, and/or a settings input, as shown in FIG. 1.

In some embodiments, process 600 can cause the notification to be presented in any suitable manner. For example, in some embodiments, the notification can be presented as a push notification on the user device, such as on a home screen or a desktop screen of the user device. As another example, in some embodiments, the notification can be presented as a push notification within a web browser window operating on the user device.

At 612, process 600 can cause the recommended content to begin being presented by the display device. In some embodiments, process 600 can cause the recommended content to begin being presented by the display device in response to receiving a selection of the cast content input on the notification as shown in and described above in connection with FIG. 1. In some embodiments, process 600 can cause the recommended content to begin being presented by the display device using any suitable technique or combination of techniques. For example, in some embodiments, process 600 can cause an application associated with presentation of media content (e.g., an application associated with a particular media content sharing service, and/or any other suitable application) to be launched on the user device and/or on the display device. In some such embodiments, the application can be launched as a background process on the user device, and playback of the media content on the display device can then be controlled via the application launched on the user device.

In some embodiments, process 600 can transmit an indication of the recommended content and/or the content itself in any suitable manner. For example, in some embodiments, process 600 can transmit an identifier and/or a location (e.g., a URL, and/or any other suitable identifier or location information) of the recommended content to the display device. As another example, in some embodiments, process 600 can transmit, to an application executing on the display device, an identifier of a particular video content item or audio content item stored on a server associated with the application. As yet another example, in some embodiments, process 600 can transmit a media stream to the display device that includes the recommended content. In some such embodiments, the display device can begin presenting the media stream as it is received. Note that, in instances where the recommended content includes a playlist of media content items, process 600 can transmit a list of identifiers of each of the media content items in the playlist of media content items, a list of locations of each of the media content items in the playlist of media content items, a media stream that includes each of the media content items in the playlist of media content items, and/or transmit indications of the media content items in any other suitable manner.

In some embodiments, process 600 can inhibit presentation of the notification in response to any suitable information or event. For example, in some embodiments, process 600 can inhibit presentation of the notification in response to determining that a user of the user device has dismissed the notification or has otherwise engaged with the notification. As another example, in some embodiments, process 600 can inhibit presentation of the notification in response to detecting an event associated with the detected display device and/or another display device. As a more particular example, in some embodiments, process 600 can inhibit presentation of the notification in response to determining that the detected display device is no longer associated with the user device (e.g., the user device and the detected display device are no longer connected to the same communication network, and/or no longer associated based on any other suitable information). As another more particular example, in some embodiments, process 600 can inhibit presentation of the notification in response to determining that the detected display device is no longer within a predetermined proximity range (e.g., within five feet, within ten feet, within twenty feet, and/or any other suitable range) based on any suitable information, such as GPS coordinates or network signal strength. As yet another more particular example, in some embodiments, process 600 can inhibit presentation of the notification in response to determining that a second display device has been detected. As yet another more particular example, in some embodiments, process 600 can inhibit presentation of the notification in response to receiving a second notification from the server that relates to recommended content for presentation on a second display device. As yet another example, in some embodiments, process 600 can inhibit presentation of the notification in response to determining that more than a predetermined duration of time (e.g., more than a minute, more than five minutes, more than an hour, and/or any other suitable duration of time) has elapsed during which a user of the user device has not engaged with the notification.

In some embodiments, at least some of the above described blocks of the processes of FIGS. 4-6 can be executed or performed in any order or sequence not limited to the order and sequence shown in and described in connection with the figure. Also, some of the above blocks of FIGS. 4-6 can be executed or performed substantially simultaneously where appropriate or in parallel to reduce latency and processing times. Additionally or alternatively, some of the above described blocks of the process of FIGS. 4-6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting notifications indicating recommended content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting notifications of recommended content, the method comprising:
   receiving an indication that a user device has initiated a casting session with a media presentation device, wherein the indication includes an identifier of media content presented on the media presentation device during the casting session;

storing the indication in a log in association with a user device identifier of the user device and a media presentation device identifier of the media presentation device;

identifying a group of media content items based on at least one media content item that has been previously selected using the user device having the user device identifier and presented using the media presentation device having the media presentation device identifier;

generating a notification that includes an indication of the identified group of media content items and a selectable input that, when the selectable input is selected, causes the identified group of media content items to begin presentation on the media presentation device; and transmitting the notification to the user device for presentation on the user device.

2. The method of claim 1, wherein the user device is associated with a user account and wherein the group of media content items is identified based on media content previously viewed in connection with the user account authenticated on the user device.

3. The method of claim 1, wherein the group of media content items is identified based on a type of media content previously presented on the media presentation device.

4. The method of claim 1, further comprising determining a previous time at which a second notification was transmitted to the user device, wherein the notification is transmitted to the user device in response to determining that more than a predetermined duration of time has elapsed since the previous time at which the second notification was transmitted to the user device.

5. The method of claim 1, further comprising:
generating a configuration table that indicates one or more media presentation devices that have been associated with the user device based on the stored log; and
transmitting, to the user device, the configuration table.

6. The method of claim 5, further comprising receiving, from the user device, a request for recommended content to be presented on the media presentation device, wherein the request received from the user device for recommended content is received after transmitting the configuration table to the user device.

7. The method of claim 1, further comprising receiving, from the user device, a request for recommended content to be presented on the media presentation device, wherein the request includes a user account identifier of user account authenticated on the user device.

8. A system for presenting notifications of recommended content, the system comprising:
a hardware processor that:
receives an indication that a user device has initiated a casting session with a media presentation device, wherein the indication includes an identifier of media content presented on the media presentation device during the casting session;
stores the indication in a log in association with a user device identifier of the user device and a media presentation device identifier of the media presentation device;
identifies a group of media content items based on at least one media content item that has been previously selected using the user device having the user device identifier and presented using the media presentation device having the media presentation device identifier;
generates a notification that includes an indication of the identified group of media content items and a selectable input that, when the selectable input is selected, causes the identified group of media content items to begin presentation on the media presentation device; and
transmits the notification to the user device for presentation on the user device.

9. The system of claim 8, wherein the user device is associated with a user account and wherein the group of media content items is identified based on media content previously viewed in connection with the user account authenticated on the user device.

10. The system of claim 8, wherein the group of media content items is identified based on a type of media content previously presented on the media presentation device.

11. The system of claim 8, wherein the hardware processor further determines a previous time at which a second notification was transmitted to the user device, wherein the notification is transmitted to the user device in response to determining that more than a predetermined duration of time has elapsed since the previous time at which the second notification was transmitted to the user device.

12. The system of claim 8, wherein the hardware processor further:
generates a configuration table that indicates one or more media presentation devices that have been associated with the user device based on the stored log; and
transmits, to the user device, the configuration table.

13. The system of claim 12, wherein the hardware processor further receives, from the user device, a request for recommended content to be presented on the media presentation device, wherein the request received from the user device for recommended content is received after transmitting the configuration table to the user device.

14. The system of claim 8, wherein the hardware processor further receives, from the user device, a request for recommended content to be presented on the media presentation device, wherein the request includes a user account identifier of user account authenticated on the user device.

15. A non-transitory computer-readable medium containing computer executable instructions that, when executed by a processor, cause the processor to perform a method for presenting notifications of recommended content, the method comprising:
receiving an indication that a user device has initiated a casting session with a media presentation device, wherein the indication includes an identifier of media content presented on the media presentation device during the casting session;
storing the indication in a log in association with a user device identifier of the user device and a media presentation device identifier of the media presentation device;
identifying a group of media content items based on at least one media content item that has been previously selected using the user device having the user device identifier and presented using the media presentation device having the media presentation device identifier;
generating a notification that includes an indication of the identified group of media content items and a selectable input that, when the selectable input is selected, causes the identified group of media content items to begin presentation on the media presentation device; and
transmitting the notification to the user device for presentation on the user device.

16. The non-transitory computer-readable medium of claim 15, wherein the user device is associated with a user account and wherein the group of media content items is identified based on media content previously viewed in connection with the user account authenticated on the user device.

17. The non-transitory computer-readable medium of claim 15, wherein the group of media content items is identified based on a type of media content previously presented on the media presentation device.

18. The non-transitory computer-readable medium of claim 15, wherein the method further comprises determining a previous time at which a second notification was transmitted to the user device, wherein the notification is transmitted to the user device in response to determining that more than a predetermined duration of time has elapsed since the previous time at which the second notification was transmitted to the user device.

19. The non-transitory computer-readable medium of claim 15, wherein the method further comprises:

generating a configuration table that indicates one or more media presentation devices that have been associated with the user device based on the stored log; and transmitting, to the user device, the configuration table.

20. The non-transitory computer-readable medium of claim 19, wherein the method further comprises receiving, from the user device, a request for recommended content to be presented on the media presentation device, wherein the request received from the user device for recommended content is received after transmitting the configuration table to the user device.

21. The non-transitory computer-readable medium of claim 15, wherein the method further comprises receiving, from the user device, a request for recommended content to be presented on the media presentation device, wherein the request includes a user account identifier of user account authenticated on the user device.

* * * * *